No Printed Specification Available
V. M. WALLACE.
Muzzle-Loading Fire-Arm.
Patented Aug. 17, 1835.
9039x
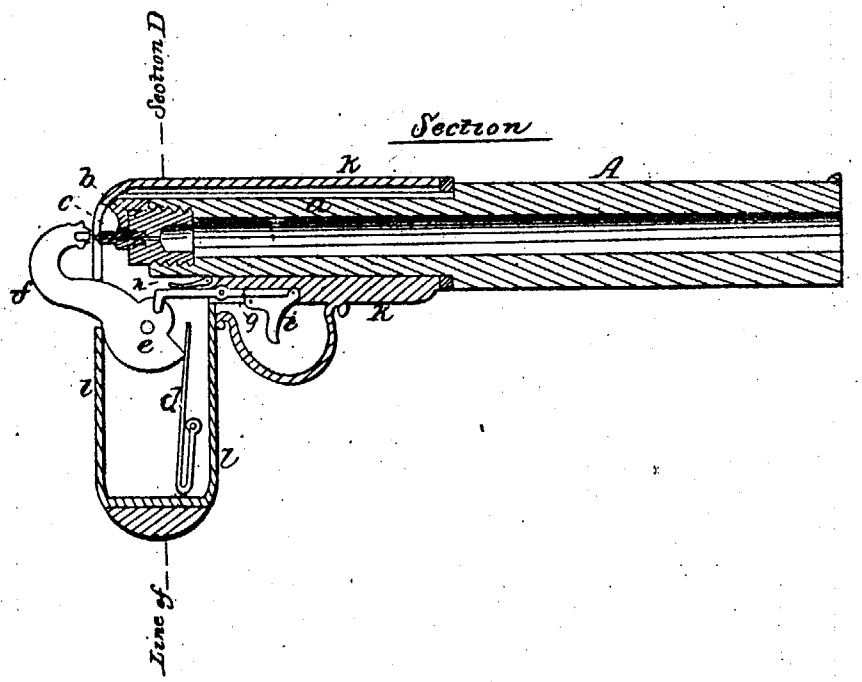
NO PRINTED COPY OF SPECIFICATION IN OFFICE.
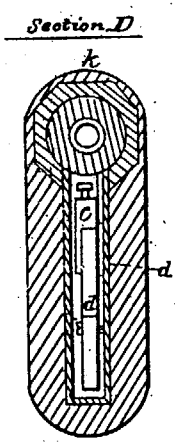

ar 14
Aug. 17. 1835 505.

Victor M. Wallace 9039X
Letters Patent

The schedule referred to in these Letters Patent and making part of the same containing a description in the words of the said Victor M. Wallace himself of his improvement in the Pocket Pistol—

To all to whom these presents shall come. Be it known that I Victor M. Wallace of West Topsham in the County of Orange and State of Vermont have invented a new and useful improvement in the Pocket Pistol and that the following is a full and exact description of the construction and operation of the said machine as invented or improved by me. The object of my invention being to give the greatest length possible to the barrel of the pistol for the purpose of discharging the ball with increased velocity & greater precission in its direction as well as to a greater distance. I dispose the parts so as to bring the butt or breech of of the barrel to the very extreme end of that part called the stock which in fact drops from that point almost in a right angle immediately beneath according to the following construction. I will commence with the barrel which is to be made in the usual way having however this difference in the shape that the back part has the girth or circumference somewhat reduced for about somewhat less than one half the whole length of said barrel so as to present a shoulder. and which reduction need only be such as to allow this said shoulder to set firmly & steadily against a plate opposed to it on the stock. The breech of this rounded part is closed by a breech pin as usual which is secured into the stock so that to unite the two the barrel is turned round and screwed on to the breech pin which motion the reduced part of the rounded barrel allows of. This breech pin is perforated by a smaller calibre than the barrel. to near the back part where the hole tapers and passes through. & into this is screwed the nipple which runs up to a shoulder left on for that purpose. the perforation through the nipple admitting the percussion powder through the centre of the pin to the charge. The pin has Drawing made has a shoulder left on it so that it can enter but a certain distance into the .. frame of the stock & the screwing of the barrel, draws the shoulder formed on it & that one on the pin as close as possible against the parts of the frame intended to oppose them. The stock of the pistol is composed of two parts. one I term the frame which is intended to hold the different parts of the lock. & the other the case or covering to this frame, which is of wood & has at the front end of it a plate secured on having the centre of it worked out into such a circle as will admit the rounded portion of the barrel up to the shoulder. The shape of this frame & case correspond & is such as to fall at once in a direct line so as to form the grasp or handle, as it were a right angle from the extremity of the nipple. The frame is made of metal intending thereby to give it not only more strength but such a weight as to poise the weapon accurately on the finger by which it is supported thereby ensuring its proper adjustment without exertion injurious to the necessity of keeping it in a right line. The lower part of this frame, which has the usual grasp or shape given to the stock is perforated through or hollowed out, but the line or plate forming the boundary of this hollow is continued round to the solid parts. The two sides of the frame are quite flat & of about equal width throughout so as to slide easily into a corresponding opening throughout the case into which it is secured by means of a pin at the lower part & within the hollow of the frame where an extension of the metal receives it. The frame is of about the same shape & length as the case. & the end of it near the trigger (as it is usually placed) fits close against the circular plate in said case which receives the barrel, by means of a dove tail shape given to that end of the frame & the thickness of the plate & against which it is held securely, when the pin is inserted as described in the grasp below. The works of the lock are contained in this lower part or grasp of the stock and are thus disposed. The main spring is placed vertically & one end secured at the side of the hollow frame next to the trigger it passes down & then rises again being doubled round in the usual shape, against this end is placed the dog of the cock cock. which is of somewhat the shape of a quadrant of a circle. having
the cock, an extension of the upper leg. & the circular part intended to
fill up the shape of the outside of the frame of the grasp into which it plays
in a groove or opening for that purpose. the cock projecting outside to cov-
er the nipple. The main spring presses against the angle of this quad-
rant. tending to force it outwards & consequently the cock against
the nipple, & between the point & the outside of the frame is fashioned
an oval projection from that leg of the quadrant - through the lower
end of which is a hole & a pin passed through the frame & it upon
which this dog plays. the upper part of the oval is formed into a
notch intended to receive an extension of the trigger which is kept
always pressed over that notch by means of a small spring, & therefore
drives the end or extension of the trigger into it when cocked which
secures it at the desired distance till discharged. The trigger is
situated in the usual place, a guard being formed for that purpose
below the frame & plays upon a pin passed through that end of it
next the grasp. the other end which projects somewhat forward is
let into the end of another piece. called an extension by a kind of dove tail
& this piece runs immediately back again & over the trigger to the point
where it bends down the frame & meets the notch in the dog & over that
end is the spring pressing from the frame above. This extension has
a hole through it to receive a pin passed through the frame behind that
of the trigger & on this it plays when drawn down at the end nearest the
barrel by the pressure applied to the trigger & in this manner they
present the appearance of two levers running parallel to each other,
the depression by the trigger elevating that end in the notch which
releases the dog & consequently drives it against the nipple. What
I claim as my invention in the above described pistol is not the discharge
from the centre of the breech pin, but simply the manner of con-
struction described, namely - the rounded back part of the barrel
with the manner in which I insert the breech pin, to the end de-
scribed of drawing the shoulders of both towards each other; & also
the disposition of the parts of the lock, as they are contained in the
lower

9039X lower part of the grasp of the stock. Also the extension of the trigger & its adjustment to the trigger as described. The object of this disposition of the works of the lock being to give the weight below or within the hand so as to poise the barrel and the shape of the barrel being to give it all possible length. In testimony that the above is a full, clear and exact description of the construction and operation of my pistol as invented or improved by me, I have hereunto set my hand the fifth day of June eighteen hundred and thirty five Witnesses
Henry Stone
Clement T. Coote Victor M. Wallace 1484 3rd

[illegible]